Sept. 22, 1925.

L. A. OSGOOD ET AL 1,554,754

DASHPOT

Filed July 26, 1923

INVENTOR
Louis A. Osgood
Elmer E. Wolf
BY
Duell, Warfield & Duell
ATTORNEY

Sept. 22, 1925.

L. A. OSGOOD ET AL

DASHPOT

Filed July 26, 1923

INVENTOR
Louis A. Osgood and
Elmer E. Wolf
BY
Duell, Warfield & Duell
ATTORNEY

Patented Sept. 22, 1925.

1,554,754

UNITED STATES PATENT OFFICE.

LOUIS A. OSGOOD, OF ST. JOHNSBURY, VERMONT, AND ELMER E. WOLF, OF SPRINGFIELD, OHIO, ASSIGNORS TO E. AND T. FAIRBANKS AND COMPANY, OF ST. JOHNSBURY, VERMONT, A CORPORATION OF VERMONT.

DASHPOT.

Application filed July 26, 1923. Serial No. 653,903.

*To all whom it may concern:*

Be it known that we, LOUIS A. OSGOOD and ELMER E. WOLF, citizens of the United States, residing at St. Johnsbury and Springfield, respectively, in the counties of Caledonia and Clark, respectively, and States of Vermont and Ohio, respectively, have invented certain new and useful Improvements in Dashpots, of which the following is a full, clear, and exact description, such as will enable others skilled in the art to which it appertains to make and use the same.

This invention relates to a dashpot and aims to provide a device of this character particularly adapted for use in connection with scales, although it may also be employed to advantage in numerous other associations.

It is an object of this invention to provide a device of the type stated, which may be attached to one of the stationary portions of a scale, such as the housing, and which is also to be attached to one of the movable portions of the scale mechanism, such as for example, the beam, the device serving to prevent any sudden and damaging movement on the part of the scale mechanism, such as would normally occur upon an appreciable load being deposited upon or removed from the platform of the scale. A further and generally useful function to be predicated to the article embraced in the present invention is that when the same is in the association aforementioned, this device will serve to bring the beam or other mechanism with which it is connected, to a position of rest within a short interval of time, so that a quick and accurate reading of the scale may readily be effected.

A further object of this invention is that of furnishing a dashpot which will employ a fluid as a cushioning agent, this fluid being preferably oil, the said device embodying a suitable construction serving to reduce to a minimum the oil splash which normally occurs incident to a sudden movement of the scale parts.

A still further object of this invention is that of providing a construction by means of which the parts will at all times be properly centred.

Another object is that of constructing a dashpot in which all movable parts are so mounted with respect to each other that friction will be reduced to a minimum to thus prevent any inaccuracy on the part of the scale reading incident to the use of this dashpot, it being noted that the beam balance of a scale is very delicate and sensitive to friction, it being also an object of this invention, to provide means serving as an adjustment for the dashpot in order that the degree of resistance offered by the same to the movement of the beam is susceptible to variation.

Another object of this invention resides in the construction of an article of the character stated which, as aforesaid, may utilize fluid such as oil as a cushioning medium, provision being made in the present invention for the introduction of this medium into the device without it being necessary to open the same and expose the mechanism thereof so that the adjustments of this mechanism will in nowise be interfered with due to this introduction or removal of the fluid, this expedient also serving to prevent any possibility of foreign particles entering the mechanism while the device is being filled or emptied.

Still another object is that of providing a dashpot which, as aforestated, is to be connected respectively with relatively immovable and movable members and in which this connection will be established by means of mechanism serving to preclude the necessity of subsequent adjustment after the device has once been installed.

An additional object of this invention resides in the provision of a dashpot which will be extremely simple in construction and readily capable of disposition in the association, in connection with which it is to be employed.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which.

Figure 1:
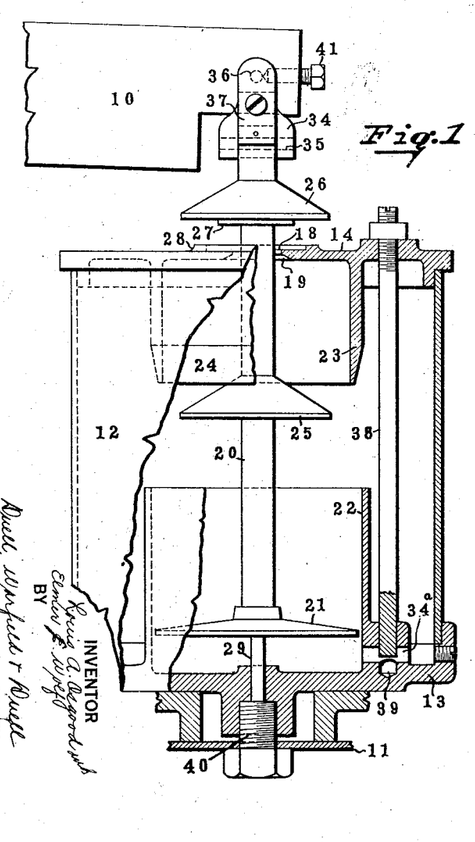
Figure 1 is a partly sectional fragmentary side elevation of a dashpot embodying the improved construction of the present invention and showing the same in association with a scale mechanism.
Figure 2:
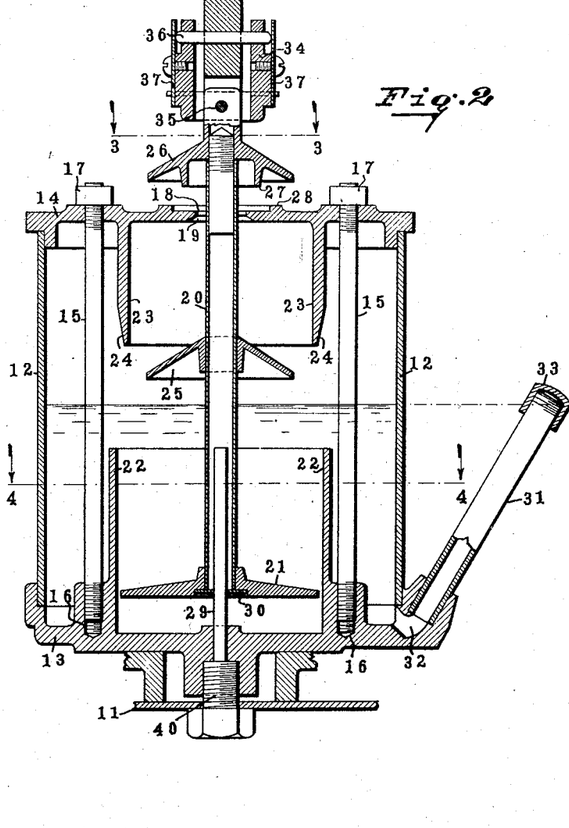
Fig. 2 is a transverse sectional view of the device as shown in Fig. 1.
Figures 3, 4, 5:
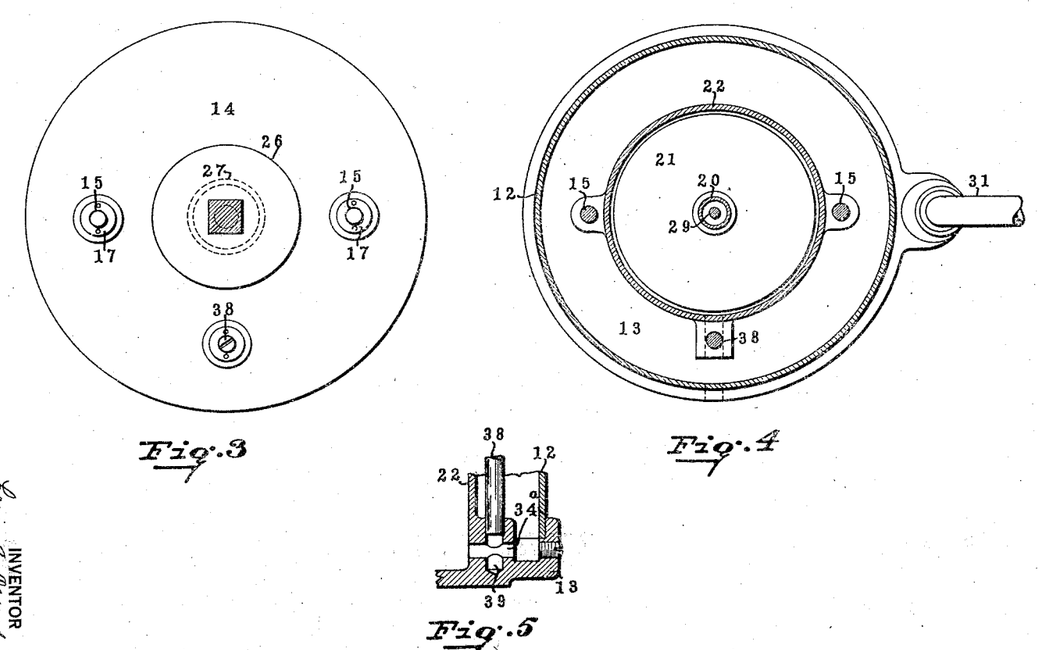
Fig. 3 is a sectional plan view taken along the lines 3—3 and in the direction of the arrows as indicated in Fig. 2.
Fig. 4 is a further plan view taken along the lines 4—4 and in the direction of the arrows also indicated in Fig. 2.
Fig. 5 is a fragmentary sectional view of a portion of the mechanism as shown in Fig. 1.

Referring more particularly to Figs. 1 and 2, it will be seen in the illustrated embodiment of the invention that the reference numeral 10 indicates the beam of a scale and 11, a fixed portion thereof, the dashpot being interposed between these two members, and connected to each of the same in a manner hereinafter set forth.

The dashpot includes a body preferably embracing a casing 12 to the lower edge of which there is attached a base 13, a cover 14 being positioned adjacent the upper edge thereof. These parts are retained in applied position with respect to each other in any suitable manner such as for example, by utilizing a pair of bolts 15 which have their inner ends screw-threaded and extending into similarly threaded recesses 16 formed in the inner face of the base 13, their upper ends projecting through openings in the cover 14 and mounting nuts 17 which serve to press against the cover to firmly lock the parts. The cover 14 is formed with a preferably central opening 18 which may be undercut adjacent its lower edge as in 19 for a purpose hereinafter brought out and a tube 20 extends through this opening and into the body of the casing 12, it being noted that the circumference of the opening is preferably materially greater than the circumference of the tube.

In order to provide the dashpot with impulse absorbing qualities a disk 21 may be utilized which is attached to the tube 20 adjacent its inner end and this disk which is preferably imperforate acts as a piston within a cylinder provided by forming the base 13 with an upwardly extending flange 22, it being noted that an adequate clearance is provided between the outer edge of the piston and the inner face of the cylinder in order to permit of a restricted flow of fluid past these elements when they are moved with respect to each other.

Now, with a view of providing means serving to prevent the fluid within the dashpot from being splashed to a point exteriorly thereof, it will be noted that the cover 14 is formed with an inwardly extending annular skirt 23 which provides a splash deflector and has a beveled surface 24 on its outer face adjacent its edge, the purpose of this surface becoming hereinafter apparent. It is here to be noted that the diameter of the skirt 23 is preferably less than the diameter of the flange 22 and the adjacent edges of both of these portions are spaced from each other. Carried by the tube 20 is a deflector or splash breaker 25 which preferably takes the form of an inverted saucer and the diameter of this member may be less than the interior diameter of the skirt 23. The tube 20 also may have connected with it at a point exterior of the casing 12 a guard 26, which presents on its inner side a downwardly extending flange 27 of a diameter greater than the opening 18 although less than that of a ridge 28 formed on the upper face of the cover 14 and concentric with the opening aforementioned.

Thus it is obvious, assuming that the beam 10 is moved with respect to the stationary portion 11, that the tube 20 will correspondingly move with respect to the casing 12 thus moving the piston 21 within the cylinder 22 from the position shown in full lines, to the uppermost position indicated in dotted lines, and in order to prevent any contact occurring between those portions of the dashpot which are movable with respect to each other, it will be seen that a guide may be provided by simply attaching a rod 29 to the base 13 and having this rod of sufficient length to extend into the bore of the tube 20 with which it is connected, by utilizing a relatively thin closure member 30 in the nature of a plate which is positioned at the lower end of the tube and is formed with an opening of sufficient diameter to snugly embrace the rod 29, it being noted that due to this construction friction between the parts is reduced to an absolute minimum although they are effectively guided due to the single point of contact afforded.

In order to introduce a cushioning fluid, such as oil, into the dashpot in such a manner that it is unnecessary to expose any of the interior mechanism thereof, it is preferred that a tube 31 be employed which tube may be attached to the base 13 and have its inner end communicating with a passage 32 formed in the latter. The outer end of this tube is screw-threaded so that a cap 33 may be attached in place to prevent the entrance of foreign particles through this tube, or in the event that it is desired to empty the cushioning fluid from the dashpot, this may be accomplished by attaching to the outer end of the tube a suction device (not shown). The fluid is flowed through the tube 31 into the interior of the casing 12 until it reaches a level substantially in line with the outer end of the tube, thus filling the cylinder 22, to the level indicated and it is to be noted in this connection that the space existing between the outer face of the flange 22 and the inner face of the casing 12 constitutes a reservoir for a reserve supply of fluid in that the level within the space and the cylinder will always be equal incident the communication afforded between these compartments by means of the passage 34$^a$ extending between the bodies of the same.

In this connection it is to be noted that it is preferred that a valve be provided for regulating the flow of the fluid through this passage and in the present embodiment of the invention this valve is furnished by employing a rod 38 which has one of its ends extending through and beyond the cover 14, which it may engage through the medium of the screw-threads, while its opposite end projects into the passage 34$^a$ and is capable of being extended across the same into a well 39 so that the flow of fluid through this passage may be regulated with that degree of nicety which is most consistent with the results desired, the fluid flow being in fact capable of being entirely cut off upon the valve being sufficiently seated.

The dashpot may be secured to any desired mechanism, or as has been shown, to the housing and beam of a scale and this connection is provided in the present instance by utilizing a U-shaped member 34 which has its base rockingly connected with the tube 20 as indicated at 35, and which has its arms secured to the beam of the scale. This latter attachment is preferably provided by utilizing a pin 36 which extends transversely of the beam 10 and projects through and beyond the arms of the member 34. The parts are thus positioned in the manner shown in Figs. 1 and 2 and in order to prevent any direct and frictional contact between the beam 10 and the member 34 it is preferred that the latter carry a pair of plates 37 attached one to each of its arms and extending adjacent the projecting ends of the pin 36 which will at all times serve to maintain the parts in the desired position, it being, of course, understood that the pin is normally locked with respect to the beam by any suitable means, such as, for example, a set screw 41. As aforesaid, pivotal connection is afforded between the tube and the member 34 so that these parts may rock in one direction with respect to each other, and it will furthermore be seen that, incident to the swinging movement permitted between the beam and the member 34 due to the connection established by the pin, a universal connection is provided. Thus it will be obvious that by reason of this connection the beam 10 may move rockingly to transmit rectilinear movement to the tube 20 so that the proper operation of the parts will in nowise be affected.

As will be apparent in Figs. 1 and 2, the connection between the dashpot and the fixed part 11 of the scale may be afforded in any desirable manner such as, for example, by forming the base 13 with a bore for the reception of the rod 29 which bore is enlarged toward its outer end and adapted to receive a bolt 40 which may also extend through the fixed portion of the scale to secure the dashpot thereto.

Now, in operation it will be understood, assuming that the device has been placed in the particular association herewith illustrated, and that the same has been filled through the tube 31 with a suitable cushioning fluid such as oil, that in the event that a sudden weight is placed upon or removed from the platform, the beam 10 would tend to move rapidly with respect to the fixed portion 11 of the scale, which would cause damage to the parts upon their movement being suddenly arrested. This rapid movement will be prevented, according to the invention herewith presented, in that the movement of the beam will be followed by the tube 20 which will act as a plunger and which is connected with the beam so that the piston 21 will obviously be moved with respect to the cylinder within which it is positioned. Incident to the fact that this cylinder is filled with oil or other suitable fluid, and for the reason that but a small quantity of this fluid can escape through the restricted annular space extant between the edges of the piston and the inner face of the cylinder, it is obvious that any sudden movement of the parts will be greatly checked. In this connection it is to be noted that this checking action may be regulated by adjusting the valve 38, to restrict to a greater or less extent, the flow of fluid through the passage 34$^a$. Thus, due to the fact that in the illustrated embodiment the piston is connected with the beam, while the cylinder is connected with a fixed portion of the scale, any movements of these two parts with respect to each other will be slowed down and the impulses will be absorbed so that damage to the mechanism of this scale will be prevented. Also, assuming that a load has been placed on the scale platform and the beam is so counterweighted that a balance will be effected, it will be understood that by means of the dashpot the usual prolonged rocking movements of the beam will be cut down to a minimum number in that each movement will be checked.

If the movements are at all rapid, as would be the case if a heavy load were removed from or deposited upon the platform of the scale the fluid within the cylinder will be subjected to a sudden pressure resulting in its being splashed or squirted. Incident to the guiding influence exerted by the walls of the cylinder, this splashing would be upwardly and towards the cover of the dashpot and would be materially checked due to the body of oil above the piston. Further due to the disposition of the splash deflector embracing the skirt 23 and the relative sizes of this member and the cylinder, as well as the employment of the splash breaker 25, the most of the squirted or splashed particles will be immediately returned to the lower portion of the dashpot and virtually all of those particles which are not returned in this manner will be deflected against the side walls of the casing 12 by means of the bevelled face 24 of the skirt. Such particles as might pass into the space embraced by the skirt will mostly strike against the under side of the cover 14 from which point they will drip to the upper surface of the deflector 25, which due to its shape, will act as a shed to return these particles to the body of fluid within the dashpot. As a further precaution against the escape of any fluid from within the device, the undercut surface 19 is provided, the function of this construction being similar to that of the bevelled face 24 of the skirt, except that any particles would be deflected towards the face of the plunger. Finally, due to the provision of the guard 26 and the flange 27 carried thereby, it becomes virtually a matter of impossibility for any particles which might conceivably pass between the space extant between the tube 20 and the edge of the opening 18, to move further than the receptacle provided by the ridge upon the upper face of the cover 14, it being obvious that any accumulation of fluid at this point would be prevented incident to the fact that the same would immediately flow back through the opening 18 and thus be returned to the interior of the device.

Thus, it will be obvious that the dashpot is initially filled through the tube 31 until the level of the fluid within the body of the device reaches its maximum point. If it is now found desirable, the valve 38 may be manipulated in order that the device may offer that degree of resistance which is most desirable to retard and cushion the rapid movements of the mechanism, and it will be seen that the action and construction of the device is such that the amount of friction is reduced to a negligible point, this being particularly necessary due to the fact that the adjustment of the scale beam is very delicate and the same is extremely sensitive to friction. In order to secure this freedom from difficulties attributable to friction, the opening 18 as aforespecified is relatively large, but it is guarded by the breaker and deflector aforedescribed, in such a manner that although the plunger at no time in the present embodiment comes into contact with the edges of this opening, it is virtually a matter of impossibility for any fluid particles to emerge through the same.

It will further be seen in connection with the anti-friction feature, that, as aforesaid, the piston preferably has its edges spaced from the inner face of the cylinder and the only point of contact other than that exterior of the body of the device, is to be found at the point of engagement of the rod 29 with the plate 30. In this latter instance, however, it will be observed that a minimum of friction will occur due to the construction adopted, this construction serving at all times to center the parts and retain the same in properly correlated positions.

Furthermore, it will be understood, that as the dashpot is filled with fluid, this fluid will rise within the reservoir provided by the spacing of the cylinder 22 from the casing 12, and will also flow through the passage 34$^a$ past the valve 38 and so into the cylinder, it being noted, due to the provision of this valve or other obstruction employed at this point, that although the supply of fluid within the cylinder is at all times replenished, the opening afforded by the passage 34$^a$ may be so restricted as to only permit the escape of an unappreciable amount of fluid through the passage when the piston is moved.

Finally referring to the connecting member, it will be understood that due to the construction involved in the same, the beam or other element to which the tube 20 is connected, is allowed to move in an arcuate path without this movement disturbing the proper operation and correlation of the parts of the dashpot.

From the foregoing it will be understood that all of the objects predicated to this invention are accomplished, and it will be furthermore appreciated that since certain changes may be made in the above construction, and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A dashpot including a body formed with an opening, an imperforate impulse absorbing means within said body, and a ridge formed on the exterior of said body and adjacent to said opening.

2. A dashpot including a body, an impulse absorbing means comprising a single disk disposed within said body means for connecting said dashpot to the mechanism with which it is to be associated, and means affording a single point of contact between the movable parts of said impulse absorbing means.

3. A dashpot including a body formed with an opening, impulse absorbing means comprising a single disk within said body and adapted to receive a fluid, actuating means connected with said last named means and extending through said opening and being spaced from the edges thereof, and disk-like means for deflecting the fluid splash away from said opening.

4. A dashpot including a body, impulse absorbing means disposed within said body, means for connecting said dashpot to the mechanism with which it is to be associated, and means affording a single point of contact for those parts of said dashpot which are movable with respect to each other.

5. A dashpot including a body, a plunger movable with respect to and extending into said body, impulse absorbing means connected with said plunger, said plunger being formed with a bore and guide means forming a part of said dashpot and extending into said bore to retain the parts in properly correlated positions.

6. A dashpot including a body, a plunger movable with respect to and extending into said body, impulse absorbing means connected with said plunger, said plunger being formed with a bore, and means affixed to said body and extending into the bore of said plunger, whereby to guide the movements of the latter.

7. A dashpot including a body, a plunger movable with respect to and extending into said body, impulse absorbing means connected with said plunger, said plunger being formed with a bore, and a rod affixed to said body and extending into the bore of the plunger for guiding the movements of the latter.

8. A dashpot including a body, a plunger movable with respect to and extending into said body, impulse absorbing means connected with said plunger, said plunger being formed with a bore, a rod affixed to said body and extending into said bore, and means carried by said plunger and presenting a relatively thin contact edge adapted to bear against said rod whereby to properly guide the movements of the latter.

9. A dashpot including a body, a plunger movable with respect to and extending into said body, impulse absorbing means connected with said plunger, said plunger being formed with a bore, a rod affixed to said body and extending into said bore, and a plate carried by said plunger and being formed with an opening, the edges thereof being adapted for engagement with said rod whereby to guide the movements of said plunger.

10. A dashpot including a body, a plunger movable with respect to and extending into said body, said plunger being formed with a bore, a closure member carried by said plunger and being formed with an opening in line with said bore, impulse absorbing means also connected with said plunger and a rod carried by said body and extending into said bore, the latter being of greater cross-sectional area than the former, the edge of the opening of the closure member being adapted to engage said rod to guide the movements of said plunger with respect to said body.

11. A dashpot including a body, a plunger movable with respect to and extending into said body, said plunger being formed with a bore, a closure member carried by said plunger and being formed with an opening in line with said bore, impulse absorbing means also connected with said plunger and a rod carried by said body and extending into said bore, the latter being of greater cross-sectional area than the former, the edge of the opening of the closure member being relatively thin and engaging said rod whereby to guide the movements of the latter with respect to said body.

12. A dashpot including a body, a plunger movable with respect to and extending into said body, impulse absorbing means connected with said plunger, said plunger being formed with a bore, a closure member carried by said plunger adjacent its inner end, and being formed with an opening in line with said bore, and a rod affixed to the inner end of said body and projecting into said bore, said rod being spaced from the inner face of said bore and being engaged by the edge of the opening presented by the closure member whereby to guide the latter in its movements with respect to said body.

13. A dashpot including a body, a plunger movable with respect to and extending into said body, impulse absorbing means connected with said plunger, said plunger being formed with a bore, a closure member carried by said plunger adjacent its inner end, and being formed with an opening in line with said bore, and a rod affixed to the inner end of said body and projecting into said bore, said rod being spaced from the inner face of said bore and being engaged by the edge of the opening presented by the closure member whereby to guide the latter in its movements with respect to said body, the contact edge of said closure member being relatively thin.

14. A dashpot including a body, a plunger movable with respect to and extending into said body, an impulse absorbing means connected with said plunger and adapted to receive fluid, and a splash breaker carried by said plunger.

15. A dashpot including a body, a plunger movable with respect to and extending into said body, an impulse absorbing means connected with said plunger and adapted to receive fluid, and a splash breaker carried by said plunger at a point beyond said impulse absorbing means.

16. A dashpot including a splash breaker comprising a body having its outer face shaped to provide a fluid shed.

17. A dashpot including a splash breaker comprising a body in the shape of an inverted saucer.

18. A dashpot including a splash breaker comprising a body in the shape of a saucer.

19. A dashpot including a body, impulse absorbing means within said body and adapted to receive fluid for its operation, and a splash deflector associated with said body, said deflector presenting a bevelled edge.

20. A dashpot including in combination, a body, a plunger movable with respect to and extending into said body, an impulse absorber connected with said plunger and adapted to receive fluid for its operation, a splash breaker carried by said plunger at a point beyond said impulse absorbing means, and a splash deflector disposed adjacent to said breaker.

21. A dashpot including, in combination, a body, a plunger movable with respect to and extending into said body, an impulse absorber connected with said plunger and adapted to receive fluid for its operation, a splash breaker carried by said plunger at a point beyond said impulse absorbing means and a splash deflector presenting a bevelled portion disposed adjacent to said breaker.

22. A dashpot including a body, a plunger movable with respect to and extending into said body, and an impulse absorber connected with said plunger, and being adapted to receive fluid for its operation, said body being formed with an opening for the passage of said plunger, the edges of said opening being undercut.

23. A dashpot including a body, an impulse absorber within said body and including a flange, said absorbing means being adapted to receive fluid for its operation, and a splash breaker within said dashpot and positioned beyond said flange, said breaker having its edge embracing less area than the area embraced by said flange.

24. A dashpot including a body, impulse absorbing means within said body and including a flange, said means being adapted to receive fluid for its operation, and a splash deflector within said body and beyond said impulse absorbing means, said deflector including a skirt embracing an area less than the area embraced by said flange.

25. A dashpot including a body, impulse absorbing means within said body and including a flange, said means being adapted to receive fluid for its operation, a splash deflector within said body and beyond said impulse absorbing means, said deflector including a skirt embracing an area less than the area embraced by said flange, and a splash breaker interposed between said deflector and the impulse absorbing means.

26. A dashpot including a body, impulse absorbing means within said body and including a flange, said means being adapted to receive fluid for its operation, a splash deflector within said body and beyond said impulse absorbing means, said reflector including a skirt embracing an area less than the area embraced by said flange, and a splash breaker also within said body.

27. A dashpot including a body, impulse absorbing means within said body and including a flange, said means being adapted to receive fluid for its operation, a splash deflector within said body and beyond said impulse absorbing means, said deflector including a skirt embracing an area less than the area embraced by said flange, and a splash breaker interposed between said deflector and the impulse absorbing means, the area embraced by the edge of said breaker being less than the area embraced by the edge of the deflector.

28. A dashpot including in combination, a body, a plunger extending into said body and movable with respect thereto, an impulse absorber connected with said plunger and including a flange, a splash deflector connected with said body and beyond said impulse absorbing means, and a splash breaker carried by said plunger.

29. A dashpot including in combination, a body, a plunger extending into said body and movable with respect thereto, an impulse absorber connected with said plunger and including a flange, a splash deflector connected with said body and beyond said impulse absorbing means, and a splash breaker carried by said plunger and disposed between said impulse absorbing means and said deflector.

30. A dashpot including a body, a flange within said body providing a cylinder, the outer walls of said flange being spaced from the inner face of said body, a piston movable within said cylinder and means for moving said piston.

31. A dashpot including a body, a plunger movable with respect to and extending into said body, a flange forming a part of an impulse absorbing means disposed within said body, said plunger being connected with said means, a splash deflector forming a part of said body and presenting a bevelled portion and a splash breaker carried by said plunger and disposed between said deflector and absorbing means.

32. A dashpot including a body, impulse absorbing means within said body, a plunger extending into said body through an opening therein and movable with respect thereto, said plunger being connected with said impulse absorbing means and a guard carried by said plunger.

33. A dashpot including a body, impulse absorbing means within said body, a plunger extending into said body through an opening therein and movable with respect thereto, said plunger being connected with said impulse absorbing means, and a guard carried by said plunger at a point exterior of said body.

34. A dashpot including a body, impulse absorbing means within said body, a plunger extending into said body through an opening therein and movable with respect thereto, said plunger being connected with said impulse absorbing means, and a guard carried by said plunger at a point exterior of said body and adjacent to said opening.

35. A dashpot including a body, impulse absorbing means within said body, a plunger extending into said body through an opening therein and movable with respect thereto, said plunger being connected with said impulse absorbing means, a guard carried by said plunger, and a flange forming a part of said guard and extending towards said opening.

36. A dashpot including a body, impulse absorbing means within said body, a plunger extending into said body through an opening therein and movable with respect thereto, said plunger being connected with said impulse absorbing means, a guard carried by said plunger, a flange forming a part of said guard and extending towards said opening, and a ridge formed on the exterior of said body and adjacent to said guard.

37. A dashpot including a body, impulse absorbing means within said body, a plunger extending into said body through an opening therein and movable with respect thereto, said plunger being connected with said impulse absorbing means, a guard carried by said plunger, a flange forming a part of said guard and extending towards said opening, and a ridge formed on the exterior of said body and adjacent to said guard, the area embraced by said ridge being greater than the area embraced by said flange.

38. A dashpot including a body, impulse absorbing means within said body, a plunger extending into said body through an opening therein and movable with respect thereto, said plunger being connected with said impulse absorbing means, a guard carried by said plunger, a flange forming a part of said guard and extending towards said opening, and a ridge formed on the exterior of said body and adjacent to said guard, the area embraced by said ridge being greater than the area embraced by said flange and less than the area embraced by the edge of the guard.

39. A dashpot including a body adapted to receive fluid, impulse absorbing means within said body and means for preventing an overfilling of said body.

40. A dashpot including a body adapted to receive fluid, impulse absorbing means within said body, and a tube having one of its ends connected with the interior of said body, its opposite end extending upwardly into a plane equal to the plane into which the upper surface of the column of fluid is to extend.

41. A dashpot including a body, impulse absorbing means within said body and dependent for its proper operation on fluid, and means forming a part of said dashpot and permitting of the connection of a draining device thereto.

42. A dashpot including a body, impulse absorbing means within said body and dependent for its proper operation on fluid, a tube having one of its ends connected with the inner end of said dashpot, its opposite end extending beyond the same and means associated with said tube whereby a draining device may be connected therewith for withdrawing the fluid from said dashpot.

43. A dashpot including a body, impulse absorbing means within said body, means adjacent one end of said dashpot for connecting the same with one part of a mechanism, and means adjacent the opposite end of said dashpot for connecting the same with a second part of said mechanism.

44. A dashpot including a body, impulse absorbing means within said body, a plunger having one of its ends connected with said means and means providing a universal joint connected with said plunger.

45. A dashpot including a body, impulse absorbing means within said body, a plunger extending through an opening in said body and having its inner end connected with said means, and means providing a universal joint attached to the opposite end of said plunger.

46. In combination, a dashpot including impulse absorbing means, a plunger connected with said means and extending beyond said body, said plunger being adapted to be reciprocated in a straight path, a mechanism adapted to be moved in an arcuate path and means for connecting said plunger with said mechanism.

47. In combination, a dashpot including impulse absorbing means, a plunger connected with said means and extending beyond said body, said plunger being adapted to be reciprocated in a straight path, a mechanism including a beam adapted to be moved in an arcuate path and means providing a universal joint connected with said beam and plunger respectively.

48. In combination, a dashpot, a plunger forming a part of said dashpot, a beam, a pin carried by said beam, a member connecting said beam and plunger and means for maintaining said member out of frictional contact with said beam.

49. In combination, a dashpot, a plunger forming a part of said dashpot, a beam, a pin carried by said beam, a member connecting said beam and plunger and means carried by said member and bearing against said pin for maintaining the former out of frictional contact with said beam.

50. In combination, a movable beam, mechanism adapted to be moved by said beam, a connecting member adapted to be attached to both of said elements, said member comprising a body, a leg forming a part of said body and presenting an opening, a pin carried by said beam and extending through said opening, and means for maintaining said leg out of contact with said beam.

51. In combination, a movable beam, mechanism adapted to be moved by said beam, a connecting member adapted to be attached to both of said elements, said member comprising a body, a leg forming a part of said body and presenting an opening, a pin carried by said beam and extending through said opening, and means carried by said member and cooperating with said pin for maintaining said leg out of contact with said beam.

52. In combination, a movable beam, mechanism adapted to be moved by said beam, a connecting member adapted to be attached to both of said elements, said member comprising a body, a leg forming a part of said body and presenting an opening, a pin carried by said beam and extending through said opening, and means carried by said member and bearing against the end of said pin for maintaining said leg out of contact with said beam.

53. In combination, a movable beam, mechanism adapted to be moved by said beam, a connecting member adapted to be attached to both of said elements, said member comprising a body, a leg forming a part of said body and presenting an opening, a pin carried by said beam and extending through said opening, and spring means carried by said member and bearing against the end of said pin for maintaining said leg out of contact with said beam.

54. In combination, a movable beam, mechanism adapted to be moved by said beam, a connecting member adapted to be attached to both of said elements, said member comprising a U-shaped body, the legs of said body being adapted to extend on opposite sides of said beam and being formed with openings, a pin carried by said beam and extending into said opening and means for maintaining the inner faces of said legs anti-frictionally spaced from the side faces of said beam.

55. In combination, a movable beam, mechanism adapted to be moved by said beam, a connecting member adapted to be attached to both of said elements, said member comprising a U-shaped body, the legs of said body being adapted to extend on opposite sides of said beam and being formed with openings, a pin carried by said beam and extending into said opening and means carried by said member for maintaining the inner faces of said legs anti-frictionally spaced from the side faces of said beam.

56. In combination, a movable beam, mechanism adapted to be moved by said beam, a connecting member adapted to be attached to both of said elements, said member comprising a U-shaped body, the legs of said body being adapted to extend on opposite sides of said beam and being formed with openings, a pin carried by said beam and extending into said openings and means carried by said member and extending adjacent the ends of said pin for maintaining the inner faces of said legs anti-frictionally spaced from the side faces of said beam.

57. In combination, a movable beam, mechanism adapted to be moved by said beam, a connecting member adapted to be attached to both of said elements, said member comprising a U-shaped body, the legs of said body being adapted to extend on opposite sides of said beam and being formed with openings, a pin carried by said beam and extending into said openings and a pair of members carried one by each of said legs and extending adjacent the ends of said pin.

58. In combination, a movable beam, a dashpot, a plunger connected with the mechanism of said dashpot and extending beyond the same, means providing a universal joint connected with said plunger, a pin carried by said beam and engaging said universal joint means and means also carried by said beam for locking said pin in position.

In testimony whereof we affix our signatures.

LOUIS A. OSGOOD.
ELMER E. WOLF.